(12) United States Patent
Lippi et al.

(10) Patent No.: US 11,554,816 B2
(45) Date of Patent: Jan. 17, 2023

(54) FREIGHT VEHICLE WITH DRIVER'S CAB

(71) Applicants: FAYMONVILLE DISTRIBUTION AG, Weiswampach (LU); COMETTO S.P.A., Borgo San Dalmazzo (IT)

(72) Inventors: Fabrizio Lippi, Roccasparvera (IT); Alexander Fickers, Weiswampach (LU); Luca Macagno, Peveragno (IT); Gabriele Giordano, Fossano (IT); Gabriele Arnaudo, Roccasparvera (IT); Francesco Froni, Cuneo (IT)

(73) Assignees: FAYMONVILLE DISTRIBUTION AG, Waisswampech (LU); COMETTO S.P.A., Borgo San Dalmazzo (IT)

( * ) Notice: Subject to any disclaimer, the term of this patent is extended or adjusted under 35 U.S.C. 154(b) by 161 days.

(21) Appl. No.: 17/174,593

(22) Filed: Feb. 12, 2021

(65) Prior Publication Data

US 2021/0253181 A1 Aug. 19, 2021

(30) Foreign Application Priority Data

Feb. 14, 2020 (LU) ........................ 101640

(51) Int. Cl.
*B62D 33/06* (2006.01)
*B62D 33/063* (2006.01)
*B62D 33/02* (2006.01)

(52) U.S. Cl.
CPC ........... *B62D 33/063* (2013.01); *B62D 33/02* (2013.01); *B62D 33/0608* (2013.01)

(58) Field of Classification Search
CPC ............ B62D 33/0604; B62D 33/0608; B62D 33/063; B62D 63/02; B61D 45/002; B61D 45/003; E21F 3/025; B60P 3/40; B60P 9/00; B60P 1/02
See application file for complete search history.

(56) References Cited

U.S. PATENT DOCUMENTS

| 3,885,643 | A | * | 5/1975 | Goodbary | .......... | B62D 33/0636 |
| | | | | | | 296/190.04 |
| 4,018,473 | A | | 4/1977 | Chalupsky | | |

(Continued)

FOREIGN PATENT DOCUMENTS

| CA | 1134882 | 11/1982 |
| CH | 639326 | 11/1983 |

(Continued)

*Primary Examiner* — Gregory A Blankenship
(74) *Attorney, Agent, or Firm* — The Belles Group, P.C.

(57) ABSTRACT

A freight vehicle has a frame defining a support surface for the goods to be transported, a plurality of rubberized wheel assemblies with suspensions, the height of which can be adjusted to shift the support surface between a lowered loading position and a raised transport position, and a driver's cab arranged beneath said support surface; the cab being coupled to, and overhanging, the frame by means of an articulated quadrilateral transmission unit and being shifted by pneumatic actuators configured to vertically move the whole cab in relation to the support surface between two extreme end positions, one approaching the support surface and one spaced apart from said support surface, and to arrange the cab in a cushioned intermediate position for the transport of the goods.

10 Claims, 2 Drawing Sheets

(56) References Cited

U.S. PATENT DOCUMENTS

| | | | | |
|---|---|---|---|---|
| 4,036,377 A | * | 7/1977 | Weber | B62D 55/06 |
| | | | | 254/421 |
| 4,078,629 A | * | 3/1978 | Kutay | E21F 13/025 |
| | | | | 296/190.04 |
| 4,365,682 A | * | 12/1982 | Frey | B62D 33/0604 |
| | | | | 296/190.04 |
| 4,761,108 A | * | 8/1988 | Kress | B62D 53/02 |
| | | | | 280/43.23 |
| 5,368,118 A | * | 11/1994 | Hoefle | B62D 33/0604 |
| | | | | 296/190.07 |
| 5,496,146 A | * | 3/1996 | Thomas | B60P 3/035 |
| | | | | 414/910 |
| 2014/0251711 A1 | * | 9/2014 | Angelo | B62D 33/063 |
| | | | | 296/190.07 |
| 2016/0052441 A1 | * | 2/2016 | Korach | B60P 7/0807 |
| | | | | 414/800 |
| 2018/0029651 A1 | * | 2/2018 | Wagner | B60G 99/008 |
| 2019/0161127 A1 | * | 5/2019 | Payne | B62D 33/0608 |
| 2019/0315413 A1 | * | 10/2019 | Howe | B62D 55/06 |
| 2021/0253181 A1 | * | 8/2021 | Lippi | B62D 33/0604 |

FOREIGN PATENT DOCUMENTS

| | | | | |
|---|---|---|---|---|
| CN | 106904053 | | 6/2017 | |
| DE | 9214555 | | 12/1992 | |
| DE | 102009008495 | * | 8/2010 | ......... B62D 33/0608 |
| EP | 0895881 | | 2/1999 | |
| EP | 2221222 | | 8/2010 | |
| WO | WO 8300666 | | 3/1983 | |

* cited by examiner

FREIGHT VEHICLE WITH DRIVER'S CAB

CROSS-REFERENCE TO RELATED APPLICATIONS

This patent application claims priority from patent application in Luxembourg No. 101640 filed on Feb. 14, 2020, the entire disclosure of which is incorporated herein by reference.

TECHNICAL FIELD

The present invention relates to a freight vehicle with a driver's cab.

BACKGROUND OF THE INVENTION

In the goods storage and handling sector, e.g. of steel products such as steel bars, steel pipes, sheet metal rolls, or simple packs of sheet metal sheets, the arrangement of goods to be handled above dedicated portal frame or bridge-type support structures with floor support feet is well known.

For the handling of these goods, the use of rubberized vehicles designed to fit beneath the above-mentioned support structures—each one comprising a frame defining a support surface or loading bed, on which the support structure rests, a driver's cab born by the frame, and a plurality of rubberized wheel assemblies supporting the frame—is also known.

The rubberized wheel assemblies are equipped with height-adjustable suspensions and, normally, solid wheels are preferred to wheels with inner tubes because they are immune to the problem of frequent puncturing in particularly hostile environments, such as, for example, a steelworks.

In the above-mentioned vehicles, the height adjustment of the suspensions allows the support surface to be brought to a lowered fitting position or minimum height position, which, once reached, allows the vehicle to be fitted beneath the portal frame support structures.

The height-adjustable suspensions also make it possible to raise the support surface and, together with this, the whole portal frame structure, and its corresponding load, until it reaches a raised transport position, wherein the support feet of the portal frame support structure are raised from the ground.

In the known vehicles described above, the cab is a dedicated cab in that it is configured to be arranged completely beneath the support surface. For this reason, the cab has a very low height that is sufficient to accommodate the driver, on the one hand, and to enable the frame to be arranged in its lowered loading position, on the other. For this purpose, the cab has its own front portion, in the vehicle's forward direction, which is hinged to the frame by means of a hinge device, in order to rotate around a fixed hinge axis parallel to the load support surface, and is always coupled, at the back of the frame, by means of an air spring that enables small oscillations around the fixed hinge axis under the control of suspension and damping elements.

Although widely used, known transport vehicles of the type described above are not very satisfactory from a driving comfort point of view, especially during the load transport phase when the vehicle is inevitably subject to jolts and, in general, high vertical acceleration values, which are transmitted to the driver. Vertical accelerations are also more noticeable to the driver when the tires are solid tires, since they have a reduced damping action when compared to other tires.

In such conditions, in fact, the cab follows the frame to which it is directly hinged and discharges, therefore, the jerking action on the driver. This is despite the fact that the hinge device may comprise blocks of elastomeric material, of the type known by the commercial term "silent blocks", which are arranged around the fixed hinge axis.

In some known solutions, the stress in the vertical direction that is transferred from the cab to the driver is partly mitigated by providing cushioned seats, e.g. pneumatic seats.

However, although these seats have high degrees of damping, making driving comfortable, they are extremely bulky, as the height of their seat from the floor of the cab is much greater than that of conventional seats. Therefore, in order to avoid the driver's head impacting against the cab ceiling, it is essential to increase the height of the cab. This is because it is impossible to decrease the distance of the cab's floor from the rolling surface of the wheels, as this distance is dictated by the arrangement of the frame in its fitting position.

The increase in height of the cab translates to an inevitable raising of the vehicle's support surface in relation to the rolling surface when the loading bed is arranged in its lowered fitting or loading position.

This raising is, however, severely hampered by the users of the handling service and by the steelworks, in particular, as it requires all existing portal frame support structures to be raised entailing high costs and adjustment times.

Not only that, but the raising of the support surface of the portal frame structure means that the existing transport vehicles will have to operate in different conditions from those anticipated in the design phase, both in the fitting or loading condition and in the transport condition. This means that the useful travel of their suspensions is reduced and the overall center of gravity is shifted upwards.

SUMMARY OF THE INVENTION

The purpose of the present invention is to provide a transport vehicle with a driver's cab, which makes it possible to resolve the problems described above simply and economically.

In particular, the purpose of the present invention is to provide a transport vehicle with a cab, the cab of which ensures a high level of driving comfort without requiring either dimensional changes to the support structures of the goods to be handled or to the planned suspension configuration of the vehicles already operating.

It is a further purpose of the present invention to provide a transport vehicle, the cab of which can guarantee a high level of driving comfort for the driver regardless of the conditions of the rolling surface of the wheel assembly wheels and the type of wheels used on the same wheel assemblies.

According to the present invention a freight vehicle is provided comprising: a frame defining a support surface for the goods to be handled; a plurality of rubberized wheel assemblies arranged beneath the frame and each one having a respective suspension; adjustment means for adjusting the height of the respective suspension and for varying the height of the support surface from the rolling surface of the wheels; a driver's cab arranged beneath said support surface; means of coupling said cab to said frame; and damping elastic means placed between said frame and said cab;

wherein said coupling means comprise a crank drive unit and actuating means placed between said frame and said cab and configured to move the whole cab vertically with respect to said support surface between two extreme end positions, one approaching said support surface and one spaced apart from said support surface, and to arrange the cab in a cushioned intermediate position for the transport of the load.

BRIEF DESCRIPTION OF THE DRAWINGS

The invention will now be described with reference to the appended drawings, which illustrate a non-limiting embodiment thereof, wherein.

DETAILED DESCRIPTION

Figure 1:
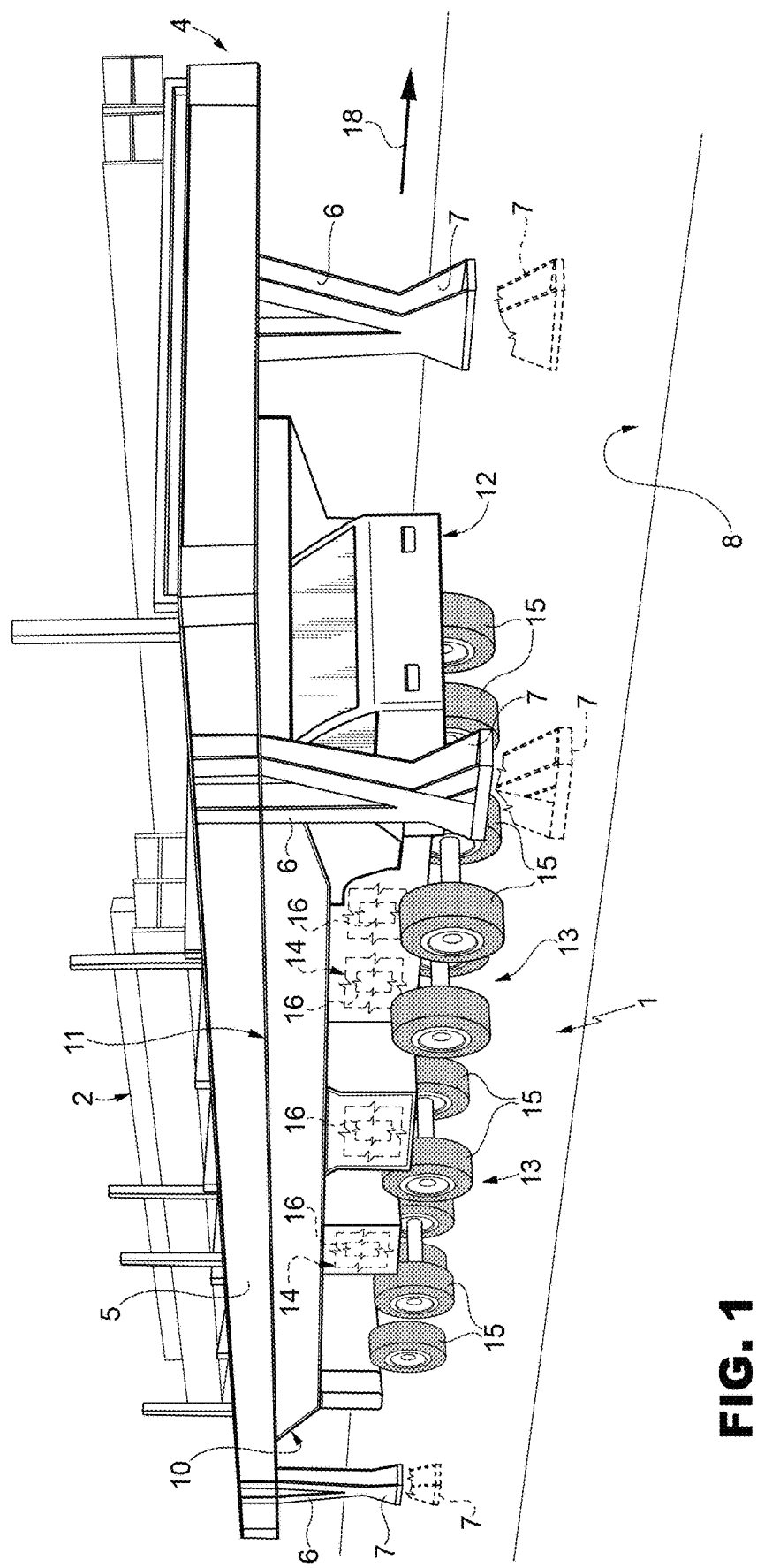
FIG. 1 illustrates, schematically and in perspective view, a support structure for a load to be handled resting on a freight vehicle equipped with a driver's cab and made according to the dictates of the present invention.

In FIG. 1, the reference number 1 indicates, as a whole, a freight vehicle 2 for transporting, for example, steel products.

In particular, the vehicle 1 is a vehicle configured for the loading and handling of goods arranged on a portal frame or bridge support structure 4, known in itself, and of the type comprising a support platform 5 for goods 2 to be handled and a plurality of pillars 6 having an upper portion firmly connected to the platform 5 and ending, at the bottom, in support feet 7 on a rolling surface 8 of the vehicle 1. The support feet 7 rest on the surface 8 during the loading of the goods onto the platform 5, and during the loading of the platform itself onto the vehicle, as shown with a dotted line in FIG. 1. The support feet are, instead, raised from the surface 8 itself at the end of the loading onto the vehicle 1, and during a transport phase, shown with a continuous line in FIG. 1.

Again with reference to FIG. 1, the vehicle 1 comprises a frame 10 defining a support surface or loading bed 11 on which the platform 5 rests, a driver's cab 12, and a plurality of rubberized wheel assemblies 13 coupled to the frame 10, in a way that is known and not described in detail.

The wheel assemblies 13 are equipped with the corresponding height-adjustable suspensions 14, which are known in themselves and only shown schematically in FIG. 1, and with the corresponding wheels 15 rolling in contact with the surface 8. Conveniently, the wheels 15 are solid wheels.

Each suspension 14 comprises hydraulic adjustment cylinders 16, known in themselves and schematically shown, which enable the frame 10 to be shifted in relation to the surface 8 between a fully lowered loading or minimum height position of the support surface 11, in which the same support surface 11 is arranged beneath the platform 5 so as to enable the vehicle 1 to slide beneath the structure 4, and a raised transport position (FIG. 1), in which the platform 5 is lying on the surface, the support feet 7 are raised from the surface 8, and the vehicle 1 can, therefore, advance in a forward direction 18 (FIG. 1).

Again with reference to FIG. 1, the driver's cab 12 is arranged beneath the frame 10 and comprises a back 12A and a floor 12B on which a conventional seat (not shown) is arranged for the driver of the vehicle 1.

The cab 12 is coupled, overhanging, to a front portion 19 of the frame 10 facing the back 12, by means of a motorized elastic transmission unit 20, and is configured to make it possible for the whole cab 12 to move vertically in relation to the frame 10, both from and towards the surface 11 of the frame 10 itself, and, in use, from and towards the surface 8.

Figure 2:
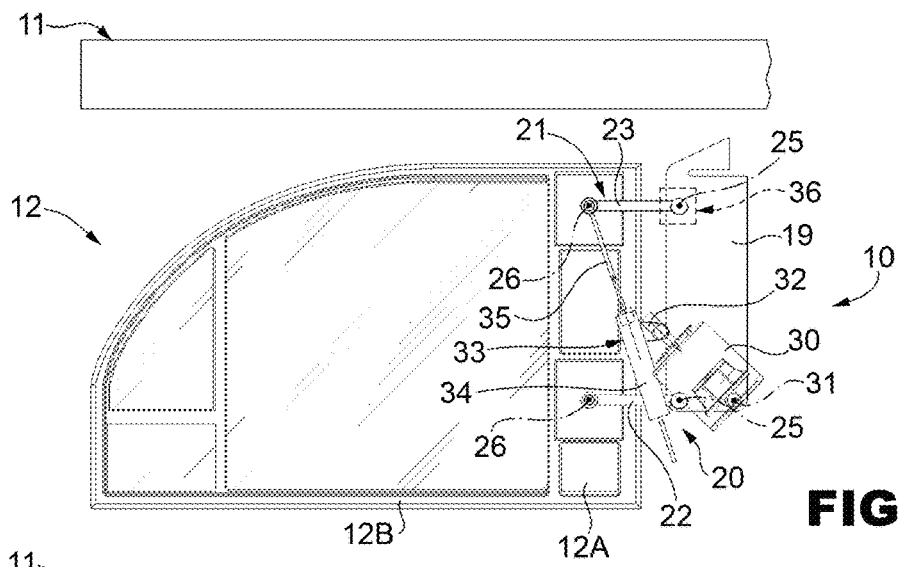
FIGS. 2 to 4 illustrate a side view of the driver's cab of the vehicle shown in FIG. 1 arranged in different functional conditions.
Figure 3:
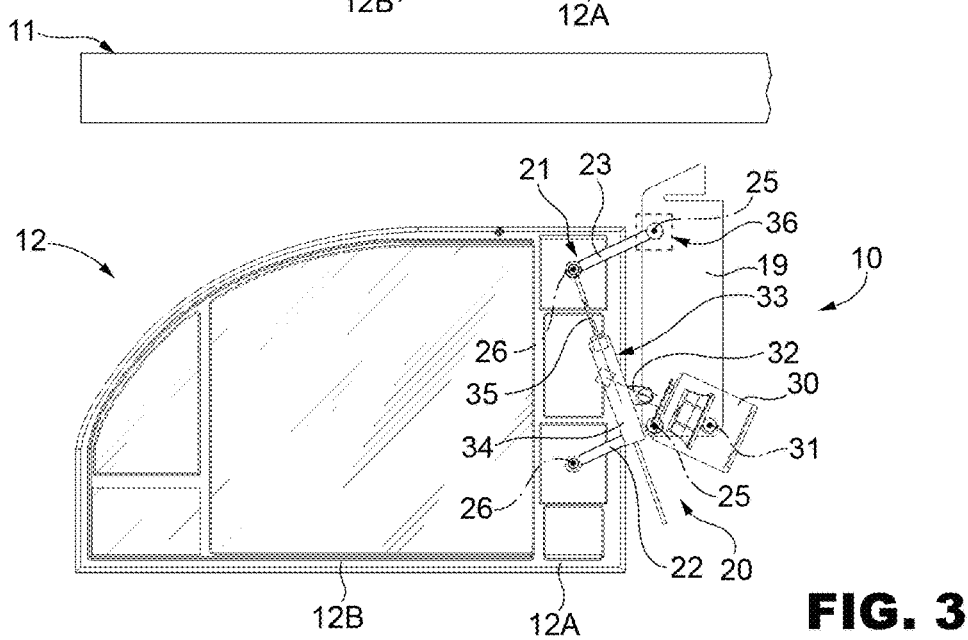
Figure 4:
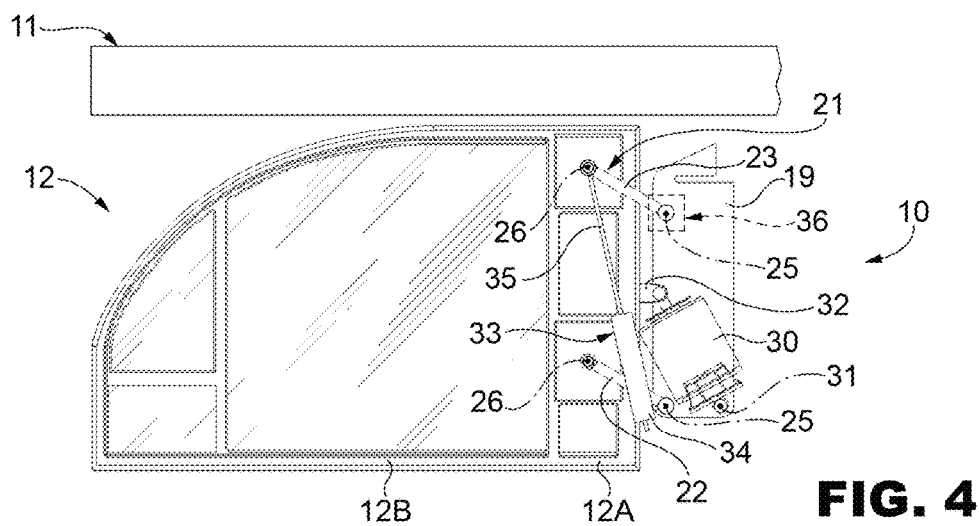

In particular, with reference to FIGS. 2 to 4, the transmission unit 20 comprises two motorized articulated quadrilateral transmissions 21 arranged on opposite lateral sides of the cab 12. Only one of these transmissions is visible in FIGS. 2 to 4.

Each transmission 21 comprises a lower crank 22 and an upper crank 23 that have the same length.

The cranks 22 and 23 are hinged, on one side, to the front portion 19 of the frame by means of respective hinge pins, in order to rotate around respective fixed hinge axes 25 in relation to the frame 10, and they are vertically spaced apart. On the other side, they are hinged to the back 12A of the cab 12 by means of respective hinge pins, in order to rotate around respective mobile hinge axes 26 in relation to the frame 10, and they are vertically spaced apart.

Conveniently, the distance between the axes 25 is equal to the distance between the other axes 26. In this way, each transmission 21 is an articulated quadrilateral transmission.

Again with reference to FIGS. 2 to 4, each transmission 21 comprises its own air actuator 30 that is pressure-controlled, e.g. controlled by means of a known and not shown levelling valve. Each actuator 30 is hinged, on one side, to the front portion 19 at the back and at the same height above the ground as the axis 25 of the crank 22 in order to rotate around an axis 31 parallel to the axes 25. On the other side, each actuator is hinged to a free end of a respective bracket 32 that is permanently connected to the back 12A and projecting, overhanging, from the back 12A towards the front portion 19 of the frame 10. Conveniently, each bracket 32 is permanently connected halfway up the height of the back 12A.

Finally, each transmission 21 comprises a damping member 33, known in itself, having a sleeve 34 hinged to the portion 19 in order to rotate around the axis 25 of the crank 22, and a stem 35 hinged to the crank 23 coaxially to its axis 26.

Again with reference to FIGS. 2 to 4, the unit 21 comprises a position transducer 36 to detect the actual height position of the cab 12 in relation to the frame 10 when the driver is on board, so as to adjust the position of the cab 12, taking into account the weight of the driver. Conveniently, the transducer 36 is an angle transducer joined to one of the axes 25. Alternatively, the transducer 36 is joined to the axes 26 or the axis 31.

According to one variant, the transducer 36 is a linear transducer placed between the frame 10 and the cab 12.

In use, the spring 30 is controlled in a synchronized manner with the suspensions 14 to shift the cab 12 vertically in relation to the frame 10, and, therefore, to the support surface 11, between two extreme end operating positions. One of these positions is raised, shown in FIG. 4, wherein the cab 12 is arranged adjacent to the surface 11 so as to enable the frame 10 to be brought into its lowered or minimum height position, and one is lowered, shown in FIG. 3. In the lowered position, the cab 12 is spaced from the surface 11 and raised from the surface 8 by a sufficient amount to avoid scraping against the same surface 8.

Conveniently, but not necessarily, when the cab 12 is in its lowered position, the spring 30 is fully compressed. The maximum compression of the spring 30 does not create substantial problems from a driving comfort point of view since the lowered cab condition occurs when the vehicle is stationary or advancing at extremely low speed. Thus, the driver is, in practice, not subject to appreciable vertical accelerations.

In the driving or load-shifting condition, the cab 12 is, however, arranged in an intermediate position between the two extreme positions and, for example, in the condition shown in FIG. 2. In the latter, when subjected to vertical accelerations, the cab is free to oscillate vertically in relation to the frame 10 and the loading bed 11, under the sole control of the spring 30 and the damper 33, always ensuring a high degree of driving comfort for the driver.

It is clear from the above that the special elastic and damped articulated parallelogram configuration of the group 20 makes high travel or controlled movements of the cab 12 in a vertical direction possible, and, therefore, effectively reduces or dampens the vertical accelerations transmitted to the driver.

The above is due to the fact that, compared to the known solutions, the crank unit 20 eliminates, in essence, any rigid vertical connections between the cab 12 and the frame 10, which are present, on the other hand, with the direct coupling of the cab to the frame.

At the same time, the unit 20 enables, again in comparison to the known solutions, the vertical dimension of the conventional driver's cabs to be kept unchanged. Therefore, both the distance of the loading platform 5 of the structure 4 from the ground and the functional or operating conditions of the suspensions 14 of the conventional wheel assemblies 13 (both in loading conditions and during transport) can also be kept unchanged.

In other words, the transmission unit 20 guarantees the high degree of driving comfort that is required by the most restrictive regulations in force and, at the same time, makes it possible to use both the conventional portal frame support structures and the current transport vehicles sized according to the features of these same support structures.

Not only that, the construction features of the unit 20 make it possible to retrofit or modernize current transport vehicles in an extremely simple, economical, and fast way, since the unit 20 is totally autonomous and independent.

Finally, the articulated parallelogram transmissions make it possible for the cab 12 to be shifted between the above-mentioned extreme end positions, while always keeping the walking wall 12B of the cab 12 itself parallel to itself, to the support surface 11, and, substantially, to the rolling surface of the wheels 5, unlike the known solutions where the hinge connection with a fixed rotation axis allowed the walking wall to be rotated around a fixed hinge axis in relation to the frame of the vehicle.

The absence of rotations between the walking wall 12B and the support surface 11, and, therefore, the rolling surface, helps to improve driving comfort.

From the above it is apparent that modifications and variations may be made to the crank unit 20 described herein without departing from the scope of the claims. In particular, articulated parallelogram transmissions 21 may comprise a different number or arrangement of cranks 22, 23, which may also have different lengths. In particular, it would be possible to provide only one transmission 21.

Not only that, the pneumatic springs 30 and/or dampers 33 could also be arranged in different positions from those indicated by way of example; thus, a number of springs 30 and/or dampers 33 other than the one indicated could be provided.

The invention claimed is:

1. A freight vehicle, comprising:
a frame defining a support surface for the goods to be handled; a plurality of rubberized wheel assemblies arranged beneath the frame, each one having a respective suspension;
adjustment means for adjusting the height of the respective suspension and for varying the height of the support surface from the rolling surface of the wheels;
a driver's cab arranged beneath said support surface;
means of coupling said cab to said frame; and
damping elastic means placed between said frame and said cab;
wherein said means of coupling comprise a crank transmission unit and actuating means placed between said frame and said cab and configured to move the whole cab vertically in relation to said support surface between two extreme end positions, one approaching said support surface and one spaced apart from said support surface, and to arrange the cab in a cushioned intermediate position for the transport of the load.

2. The vehicle according to claim 1, wherein said crank transmission unit comprises cranks hinged on one side to said support frame, in order to rotate in relation to the support frame around the respective fixed hinge axes, and to said cab, in order to rotate around mobile hinge axes parallel to said fixed hinge axes.

3. The vehicle according to claim 2, wherein said cranks form part of at least one articulated quadrilateral transmission.

4. The vehicle as claimed in claim 2, wherein said cranks are all of the same length.

5. The vehicle according to claim 3, wherein said cranks form part of two articulated quadrilateral transmissions; said two articulated quadrilateral transmissions being arranged on opposite lateral sides of said cab.

6. The vehicle according to claim 2, wherein said cranks extend in parallel positions whatever the position of said cab in relation to said support surface.

7. The vehicle according to claim 1, wherein said cab extends, overhanging, from an end portion of said frame.

8. The vehicle according to claim 1, wherein said cab comprises a back and in that said crank transmission unit is placed between said back and a front portion of said frame facing said back.

9. The vehicle according to claim 1, wherein said cab has a lower walking wall and in that said crank transmission unit and said actuating means are configured to keep an angle of said walking wall constant in relation to said support surface regardless of the position of said cab between said extreme positions.

10. The vehicle according to claim 1, wherein said actuating means comprise at least one pneumatic spring.

* * * * *